United States Patent
Okuda et al.

(10) Patent No.: US 10,259,248 B2
(45) Date of Patent: Apr. 16, 2019

(54) INK JET RECORDING METHOD

(71) Applicant: Seiko Epson Corporation, Tokyo (JP)

(72) Inventors: Ippei Okuda, Shiojiri (JP); Tsuyoshi Sano, Shiojiri (JP); Mitsuaki Kosaka, Minowa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/889,498

(22) Filed: Feb. 6, 2018

(65) Prior Publication Data

US 2018/0244094 A1 Aug. 30, 2018

(30) Foreign Application Priority Data

Feb. 24, 2017 (JP) .................. 2017-033487

(51) Int. Cl.
*B41J 11/00* (2006.01)
*C09D 11/54* (2014.01)
*B41M 5/00* (2006.01)
*B41J 2/01* (2006.01)
*C09D 11/107* (2014.01)
(Continued)

(52) U.S. Cl.
CPC ............. *B41M 5/0017* (2013.01); *B41J 2/01* (2013.01); *B41J 2/2107* (2013.01); *B41J 11/002* (2013.01); *B41J 11/0015* (2013.01); *C09D 11/00* (2013.01); *C09D 11/033* (2013.01);
(Continued)

(58) Field of Classification Search
CPC ........ B41J 2/01; B41J 2/2107; B41J 11/0015; B41J 11/002; B41M 5/0017; C09D 11/00; C09D 11/033; C09D 11/037; C09D 11/107; C09D 11/322; C09D 11/54
See application file for complete search history.

(56) References Cited

U.S. PATENT DOCUMENTS 6,786,588 B2 * 9/2004 Koyano ............ B41M 5/0017
347/100
2009/0079784 A1 3/2009 Chiwata et al.
(Continued)

FOREIGN PATENT DOCUMENTS

JP 5330763 B2 10/2013
JP 2014-034167 A 2/2014

OTHER PUBLICATIONS

Extended European Search Report for Patent Application No. EP 18155984.0, dated Jun. 25, 2018 (9 pages).

*Primary Examiner* — Anh T.N. Vo
(74) *Attorney, Agent, or Firm* — Harness, Dickey & Pierce, P.L.C.

(57) ABSTRACT

An ink jet recording method includes: a reaction liquid application step of ejecting from an ink jet head, a reaction liquid containing an aggregating agent which aggregates an ink composition so as to adhere the reaction liquid to a recording medium which is a non-absorptive recording medium or a low-absorptive recording medium; a reaction liquid drying step of drying the reaction liquid adhered to the recording medium; and an ink composition application step of ejecting the ink composition from the ink jet head so as to apply the ink composition to the recording medium to which the reaction liquid is adhered. When the ink composition is to be adhered, the reaction liquid is dried so that an evaporated amount of water and an organic solvent contained in the reaction liquid are 70 percent by mass or more and 60 percent by mass or less, respectively.

20 Claims, 1 Drawing Sheet

(51) Int. Cl.
  *C09D 11/322* (2014.01)
  *B41J 2/21* (2006.01)
  *C09D 11/00* (2014.01)
  *C09D 11/037* (2014.01)
  *C09D 11/033* (2014.01)

(52) U.S. Cl.
  CPC .......... *C09D 11/037* (2013.01); *C09D 11/107* (2013.01); *C09D 11/322* (2013.01); *C09D 11/54* (2013.01)

(56) References Cited

U.S. PATENT DOCUMENTS

| | | |
|---|---|---|
| 2009/0315926 A1 | 12/2009 | Yamanobe |
| 2011/0211012 A1 | 9/2011 | Irita |
| 2014/0043393 A1 | 2/2014 | Takeuchi |
| 2014/0375737 A1* | 12/2014 | Van Beek .............. B41J 11/002 347/102 |
| 2016/0137441 A1* | 5/2016 | La Vos .................... B41J 13/08 271/276 |
| 2016/0303873 A1 | 10/2016 | Okuda et al. |

* cited by examiner

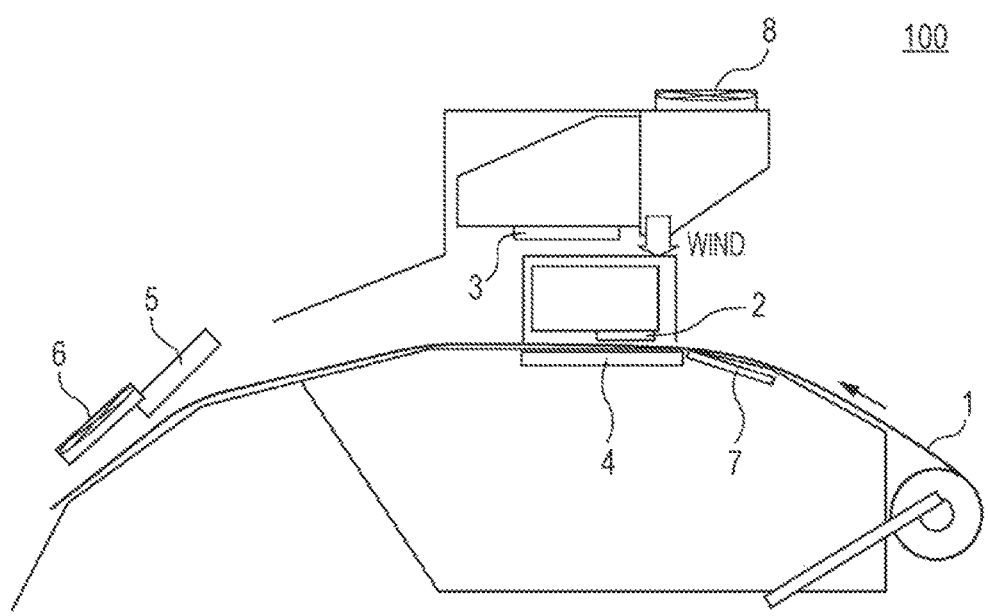

INK JET RECORDING METHOD

BACKGROUND

1. Technical Field

The present invention relates to an ink jet recording method.

2. Related Art

Since an ink jet recording method is able to record a highly fine image by a relatively simple apparatus, techniques relating to this recording method have been rapidly developed in various fields. In particular, various studies on ejection stability and the like have been carried out. For example, JP-A-2014-34167 has disclosed an ink jet recording method which includes a pre-treatment liquid application step of applying to a recording medium, a pre-treatment liquid (reaction liquid) which contains an organic solvent, water, and an aggregating agent aggregating a color material component of an ink; and an ink ejection step of performing an ink-jet ejection of an ink containing a color material and water onto the recording medium.

When the above ink jet recording method using a reaction liquid is applied to a non-absorptive recording medium or a low-absorptive recording medium, each of which functions as a recording medium, it was found that an image quality is influenced by a drying state of the reaction liquid. When the ink was applied in the state in which a reaction liquid adhered to the recording medium is not sufficiently dried, problems of image quality, such as a covering property, were observed. On the other hand, depending on the degree of drying of the reaction liquid adhered to the recording medium, an image quality, such as color stability, was disadvantageously degraded.

SUMMARY

An advantage of some aspects of the invention is that in an ink jet recording method using a reaction liquid for a recording medium which is a non-absorptive recording medium or a low-absorptive recording medium, an ink jet recording method capable of improving the image quality is provided.

In order to overcome the problems described above, intensive research was carried out by the present inventors. As a result, it was found that after a reaction liquid drying step is performed, when an ink composition is applied, evaporated amounts of water and an organic solvent contained in a reaction liquid are significantly important for improvement in image quality. The evaporated amounts each may be determined by combination between the composition of the reaction liquid and the conditions of the reaction liquid drying step.

An ink jet recording method according to one aspect of the invention comprises: a reaction liquid application step of ejecting from an ink jet head, a reaction liquid in the form of liquid droplets containing an aggregating agent which aggregates an ink composition so as to adhere the reaction liquid to a recording medium which is a non-absorptive recording medium or a low-absorptive recording medium; a reaction liquid drying step of drying the reaction liquid applied to the recording medium; and an ink composition application step of ejecting the ink composition in the form of liquid droplets from an ink jet head so as to apply the ink composition to the recording medium to which the reaction liquid is adhered. In the reaction liquid drying step described above, when the ink composition is to be applied, the reaction liquid is dried so that evaporated amounts of water and an organic solvent contained in the reaction liquid are 70 percent by mass or more and 60 percent by mass or less, respectively.

According to the above, when the ink composition is to be applied, the evaporated amount of the water contained in the reaction liquid is high, such as 70 percent by mass or more, and the evaporated amount of the organic solvent contained in the reaction liquid is low, such as 60 percent by mass or less. As described above, since a remaining amount of the water which disturbs the aggregation of the ink composition is decreased, and a remaining amount of the organic solvent which is desired for mixing with the ink composition is increased, the spreadability of the ink can be appropriately controlled, a covering property is improved, and bleeding can be suppressed.

In the reaction liquid application step, the recording medium preferably has a surface temperature of 45° C. or less. Accordingly, the drying of the ink composition in the ink jet head can be suppressed, and clogging of the head can be prevented.

In the reaction liquid drying step, when the ink composition is to be applied, the reaction liquid is preferably dried so that the evaporated amounts of the water and the organic solvent contained in the reaction liquid are 90 percent by mass or more and 10 percent by mass or less, respectively. Accordingly, the spreadability of the ink is appropriately controlled, the covering property is improved, and the bleeding can be suppressed.

The reaction liquid preferably contains an organic solvent having a normal boiling point of 150° C. to 280° C. Accordingly, the evaporation of the organic solvent contained in the reaction liquid in the head is prevented, so that clogging of nozzles can be prevented. In addition, when the reaction liquid is mixed with the ink composition on the recording medium, the organic solvent can be rapidly evaporated, and in the ink non-absorptive recording medium or the ink low-absorptive recording medium, a sufficient image quality can be obtained.

The content of an organic solvent having a normal boiling point of more than 280° C. in the reaction liquid is preferably 3 percent by mass or less. Accordingly, when the reaction liquid is mixed with the ink composition, the organic solvent can be rapidly evaporated, and in the ink non-absorptive recording medium or the ink low-absorptive recording medium, sufficient image quality and fixability can be obtained.

The content of an organic solvent having a normal boiling point of more than 280° C. in the ink composition is preferably 3 percent by mass or less. Accordingly, the organic solvent in the ink composition applied to the recording medium can be rapidly evaporated, and in the ink non-absorptive recording medium or the ink low-absorptive recording medium, sufficient image quality and fixability can be obtained.

The ink jet recording method described above preferably further comprises: heating the recording medium by a pre-heating unit provided at an upstream side in a recording medium transportation direction than a recording medium support portion which supports the recording medium when the reaction liquid is applied thereto, and the reaction liquid is applied to the recording medium thus heated. Since the recording medium is heated by the pre-heating unit, the evaporated amounts of the water and the organic solvent of the reaction liquid on the recording medium can be adjusted.

In the reaction liquid application step, an adhesion amount of the reaction liquid is preferably 3 mg/inch$^2$ or less in a reaction liquid adhesion region. Since the adhesion amount of the reaction liquid is decreased as described above, the drying property of the reaction liquid after the ink composition is applied thereto can be improved, and hence, the image quality can be improved.

In a region in which an adhesion amount of the ink composition is 5 mg/inch$^2$ or more of an ink composition adhesion region, the adhesion amount of the reaction liquid is preferably 0.1 mg/inch$^2$ or more. Accordingly, since the reaction liquid is applied to the region in which the ink composition is to be applied, the image quality of an image formed on the recording medium can be improved.

The content of the aggregating agent in the reaction liquid is preferably 1 to 20 percent by mass. Accordingly, while the image quality is improved, the balance with other characteristics, such as abrasion resistance, can be obtained.

The mass of the reaction liquid per one liquid droplet in the reaction liquid application step is preferably 10 ng/dot or less. Since the mass of the reaction liquid per one liquid droplet is decreased as described above, the image quality can be improved.

The resolution of the liquid droplets of the reaction liquid in the reaction liquid application step is preferably 200×200 dpi or more. Since the resolution of the liquid droplets of the reaction liquid is increased as described above, the image quality can be improved.

For example, the aggregating agent is preferably at least one of a polyvalent metal salt, an organic acid, and a cationic compound. Accordingly, the ink composition can be aggregated, and the image quality can be improved.

The ink jet recording method described above preferably further comprises: an ink-composition primary drying step of drying the ink composition applied to the recording medium at a recording medium support portion which faces the ink jet head ejecting the ink composition, and in the ink-composition primary drying step, the ink composition is preferably dried so that an evaporated amount of the total water contained in the reaction liquid and the ink composition is 70 percent by mass or more. Accordingly, the balance between improvement in image quality and a decrease in the time for recording can be obtained.

The reaction liquid ejected from the ink jet head preferably contains 45 to 90 percent by mass of water and 5 to 45 percent by mass of the organic solvent.

BRIEF DESCRIPTION OF THE DRAWINGS

Embodiments of the invention will be described with reference to the accompanying drawings, wherein like numbers reference like elements.

The FIGURE is a schematic view of an ink jet apparatus used for an ink jet recording method according to this embodiment.

DESCRIPTION OF EXEMPLARY EMBODIMENTS

Hereinafter, although an embodiment (hereinafter, referred to as "this embodiment") of the invention will be described in detail with reference to the drawing if needed, the invention is not limited thereto and may be variously changed without departing from the scope of the invention. In addition, in the drawing, the same element is designated by the same reference numeral, and duplicated description will be omitted. In addition, the positional relationship, such as up to down and left to right, is based on the positional relationship shown in the drawing unless otherwise particularly noted. Furthermore, the dimensional ratio in the drawing is not limited to the ratio shown in the drawing.

An ink jet recording method according to this embodiment comprises: a reaction liquid application step of ejecting from an ink jet head, a reaction liquid in the form of liquid droplets containing an aggregating agent which aggregates an ink composition so as to adhere the reaction liquid to a recording medium which is a non-absorptive recording medium or a low-absorptive recording medium; a reaction liquid drying step of drying the reaction liquid applied to the recording medium; and an ink composition application step of ejecting the ink composition in the form of liquid droplets from the ink jet head so as to apply the ink composition to the recording medium to which the reaction liquid is adhered, and in the reaction liquid drying step, before the ink composition is applied, the reaction liquid is dried so that evaporated amounts of water and an organic solvent contained in the reaction liquid are 70 percent by mass or more and 60 percent by mass or less, respectively.

Accordingly, when the ink composition is applied, the evaporated amount of the water contained in the reaction liquid is high, such as 70 percent by mass or more, and the evaporated amount of the organic solvent is low, such as 60 percent by mass or less. As described above, since a remaining amount of the water which disturbs the aggregation of the ink composition is decreased, and a remaining amount of the organic solvent which is desired for mixing with the ink composition is increased, the balance of spreadability of the ink is improved, the covering property is improved, and the bleeding can be reduced.

When the ink composition is applied, an evaporated amount W of the water contained in the reaction liquid indicates a moisture amount (percent by mass) evaporated from the time of the application of the reaction liquid to the time of the application of the ink composition, and when a moisture amount of the reaction liquid at an initial stage is represented by W1 and a moisture amount of the reaction liquid when the ink composition is applied is represented by W2, the evaporated amount W is defined by the following formula. W2 may be measured, for example, using a moisture meter.

$$W=[(W1-W2)/W1]\times 100$$

When the ink composition is applied, an evaporated amount R of the organic solvent contained in the reaction liquid indicates an organic solvent amount (percent by mass) evaporated from the time of the application of the reaction liquid to the time of the application of the ink composition, and when the content of an organic solvent amount of the reaction liquid at an initial stage is represented by R1 and an organic solvent amount of the reaction liquid when the ink composition is to be applied is represented by R2, the evaporated amount R is defined by the following formula. R2 is measured, for example, by liquid chromatography.

$$R=[(R1-R2)/R1]\times 100$$

Hereinafter, a reaction liquid, an ink composition, a recording medium, and an ink jet apparatus used for the ink jet recording method of this embodiment will be described.
Reaction Liquid The reaction liquid contains an aggregating agent which aggregates the ink composition. The reaction liquid is applied to the recording medium before the ink composition is applied thereto. Since the reaction liquid is applied to the recording medium in advance, compared to the case in which the ink composition is directly applied to the recording medium, the image quality can be improved. Hereinafter, components of the reaction liquid will be described.

Aggregating Agent

The aggregating agent reacts with one of the components contained in the ink composition and preferably reacts with one of a color material and a resin, so that a function of aggregating the color material together with the resin contained in the ink composition is obtained. Accordingly, after the ink droplets land on the recording medium, since the color material contained therein is aggregated, and the ink droplets are thickened, the interference therebetween can be suppressed, so that an image having no density irregularity can be formed.

As the aggregating agent, any one of a polyvalent metal salt, an organic acid, and a cationic compound is preferable, any one of the two former compounds is more preferable, and the first compound is further preferable. The content of the aggregating agent contained in the reaction liquid is preferably 1 to 20 percent by mass. Accordingly, the ink composition can be aggregated, and the image quality can be improved.

The polyvalent metal compound is a compound formed of a polyvalent metal ion having a valence of 2 or more and an anion. As the polyvalent meal ion having a valence of 2 or more, for example, $Ca^{2+}$, $Mg^{2+}$, $CU^{2+}$, $N1^{2+}$, $Zn^{2+}$, or $Ba^{2+}$ may be mentioned. As the anion, for example, $Cl^-$, $NO_3^-$, $CH_3COO^-$, $I^-$, $Br^-$, or $ClO_3^-$ may be mentioned. Among those ions mentioned above, since the above aggregating effect can be further enhanced, a magnesium salt, calcium salt, and an aluminum salt may be preferably used.

Although the organic acid is not particularly limited, for example, acetic acid, propionic acid, and a lactic acid may be mentioned.

Although the cationic compound is not particularly limited, a cationic polymer, a cationic surfactant, and the like may be used, and for example, a cationic polymer, such as a polyallylamine or a quaternary salt thereof, which is water-soluble and is positively charged in water may be mentioned.

The content of the aggregating agent in the reaction liquid is preferably 1 to 20 percent by mass, more preferably 2 to 10 percent by mass, and further preferably 3 to 7 percent by mass. The content of the aggregating agent in the reaction liquid based on the mole concentration is preferably 0.1 to 1.5 mol/kg, more preferably 0.3 to 1.0 mol/kg, and further preferably 0.3 to 0.5 mol/kg. Accordingly, while the image quality is improved, the balance with other characteristics, such as the abrasion Resistance, can be Obtained.

Organic Solvent

The reaction liquid preferably contains an organic solvent. Accordingly, evaporation of the organic solvent contained in the reaction liquid in the head is prevented, and clogging of nozzles can be prevented. In addition, when the reaction liquid is mixed with the ink composition on the recording medium, the organic solvent is diffused in the liquid, the reaction liquid and the ink are rapidly mixed with each other, and a reaction between components of the ink and the aggregating agent can be promoted, so that in the ink non-absorptive recording medium or the ink low-absorptive recording medium, a sufficient image quality can be obtained.

Organic Solvent Having Normal Boiling Point of 150° C. to 280° C.

The reaction liquid preferably contains an organic solvent having a normal boiling point of 150° C. to 280° C. and more preferably contains an organic solvent having a normal boiling point of 180° C. to 250° C. Accordingly, the evaporation of the organic solvent contained in the reaction liquid in the head is prevented, and the clogging of the nozzles can be prevented. In addition, when the reaction liquid is mixed with the ink composition on the recording medium, the organic solvent is diffused in the liquid, the reaction liquid and the ink are rapidly mixed with each other, and the reaction between the components of the ink and the aggregating agent can be promoted, so that in the ink non-absorptive recording medium or the ink low-absorptive recording medium, a sufficient image quality can be obtained. In addition, when the boiling point of the organic solvent contained in the reaction liquid is in the range described above, it is preferable since the evaporated amounts of the water and the organic solvent contained in the reaction liquid each can be easily set in a preferable range described below when the ink is applied to the recording medium.

As the organic solvent, a nitrogen-containing solvent may also be contained. Accordingly, the resin in the ink composition can be stably dissolved, and the reaction liquid can be mixed with the ink composition. In addition, the nitrogen-containing solvent has a function to promote softening of the resin particles contained in the ink composition and tends to improve the adhesion even when the heating temperature is low.

Although the nitrogen-containing solvents are not particularly limited, for example, there may be mentioned a pyrrolidone-based, an imidazolidinone-based, an amide ether-based, a pyridine-based, a pyradine-based, and a pyridone-based solvent. In addition, the pyrrolidone-based solvent is preferable, and for example, 2-pyrrolidone, N-methyl-2-pyrrolidone, and N-ethyl-2-pyrrolidone may be mentioned. The nitrogen-containing solvents may be used alone, or at least two thereof may be used in combination.

As the above organic solvent, other organic solvents other than the nitrogen-containing solvents may also be contained. The other organic solvents mentioned above are each preferably a polyol compound, more preferably an alkanediol, and further preferably an alkanediol having 3 to 7 carbon atoms. Although the other organic solvents are not particularly limited, for example, there may be concretely mentioned an alcohol and a glycol, such as ethylene glycol, diethylene glycol, triethylene glycol, propylene glycol, dipropylene glycol, 1,3-propanediol, 1,2-butandiol, 1,2-pentanediol, 1,2-hexanediol, 1,4-butanediol, 1,5-pentanediool, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol. Those solvents may be used alone, or at least two types thereof may be used in combination.

The total amount of the organic solvents (the nitrogen-containing solvent may also be included) in the reaction liquid is, with respect to the total mass of the reaction liquid, preferably 5.0 to 45 percent by mass or more, more preferably 5.0 to 40 percent by mass, further preferably 10 to 35 percent by mass, and even further preferably 15 to 30 percent by mass. In addition, the content of the nitrogen-containing solvent is, with respect to the total mass of the reaction liquid, preferably 2 to 20 percent by mass and more preferably 3 to 10 percent by mass. In addition, among the organic solvents, the content of the organic solvent having a normal boiling point of 150° C. to 280° C. with respect to the total mass of the reaction liquid is preferably in the range described above.

Organic Solvent Having Normal Boiling Point of More than 280° C.

In the reaction liquid, the content of an organic solvent having a normal boiling point of more than 280° C. is preferably 3 percent by mass or less. When the reaction liquid contains the organic solvent having a normal boiling point of more than 280° C., the drying property of the reaction liquid on the recording medium is seriously degraded. As a result, in various recording media, and in particular, in the ink non-absorptive recording medium or the ink low-absorptive recording medium, density irregularity of the image is not only apparently observed but also the fixability of the ink cannot be obtained.

The content of the organic solvent having a normal boiling point of more than 280° C. in the reaction liquid is, with respect to the total mass of the reaction liquid, preferably 2 percent by mass or less, more preferably 1 percent by mass or less, even more preferably 0.5 percent by mass or less, particularly preferably 0 to less than 0.1 percent by mass, further preferably 0 to less than 0.05 percent by mass, even further preferably 0 to less than 0.01 percent by mass, and most preferably 0 to less than 0.001 percent by mass. When the content is in the range described above, the abrasion resistance of a recorded material is suppressed from being degraded by the organic solvent having a normal boiling point of more than 280° C., and a recorded material more excellent in abrasion resistance can be obtained.

Surfactant

The reaction liquid preferably contains a surfactant. Although the surfactant is not particularly limited, for example, an acetylene glycol-based surfactant, a fluorine-containing surfactant, and a silicone-based surfactant may be mentioned. Among those surfactants, the acetylene glycol-based surfactant and the silicone-based surfactant are preferable. As those surfactants, the same surfactant as that of the ink composition may also be used.

The content of the surfactant is, with respect to 100 percent by mass of the reaction liquid, preferably 0.1 to 2.0 percent by mass, more preferably 0.1 to 1.7 percent by mass, and further preferably 0.1 to 1.5 percent by mass. WATER The reaction liquid contains water. As the water, for example, there may be mentioned pure water, such as ion-exchanged water, ultrafiltrated water, reverse osmosis water, or distilled water, or water, such as ultrapure water, in which ionic impurities are removed as much as possible. In addition, when water sterilized, for example, by UV irradiation or by addition of hydrogen peroxide is used, in the case of long-term storage of a pigment dispersion liquid and an ink using the same, the generation of fungi and bacteria can be suppressed.

Although the content of the water is not particularly limited, the reaction liquid preferably contains water in an amount larger than that of the organic solvent. The content of the water is, with respect to 100 percent by mass of the reaction liquid, preferably 40 to 95 percent by mass, more preferably 45 to 90 percent by mass, and further preferably 50 to 80 percent by mass.

The reaction liquid may also contain components, such as a resin, a glue agent (such as a starch, a cellulose, a polysaccharide, a protein, or a water-soluble polymer), a pH adjuster, and an antiseptic agent/fungicide.

Ink Composition

The ink composition of this embodiment is an aqueous ink-jet ink composition. Hereinafter, components contained in the ink composition will be described.

Color Material

Although a pigment or a dye may be used as the color material, a pigment is preferably used. Although the pigment is not particularly limited, for example, the following may be mentioned.

Although a black pigment is not particularly limited, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven 5750, Raven 5250, Raven 5000, Raven 3500, Raven 1255, or Raven 700 (manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, or Monarch 1400 (manufactured by CABOT JAPAN K.K.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, or Special Black 4 (manufactured by Degussa).

Although a white pigment is not particularly limited, for example, there may be mentioned C.I. Pigment White 6, 18, or 21, or a white inorganic pigment, such as titanium oxide, zinc oxide, zinc sulfide, antimony oxide, magnesium oxide, or zirconium oxide, may be mentioned. As a pigment other than those white inorganic pigments, a white organic pigment, such as white hollow resin particles or white polymer particles, may also be used.

Although a pigment to be used for a yellow ink is not particularly limited, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

Although a magenta pigment is not particularly limited, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245; or C.I. Pigment Violet 19, 23, 32, 33, 36, 38, 43, or 50.

Although a cyan pigment is not particularly limited, for example, there may be mentioned C.I. Pigment Blue 1, 2, 3, 15, 15:1, 15:2, 15:3, 15:34, 15:4, 16, 18, 22, 25, 60, 65, or 66; or C.I. Vat Blue 4 or 60.

In addition, although pigments to be used for color inks other than magenta, cyan, and yellow are not particularly limited, for example, there may be mentioned C.I. Pigment Green 7 or 10; C.I. Pigment Brown 3, 5, 25, or 26; C.I. Pigment Orange 1, 2, 5, 7, 13, 14, 15, 16, 24, 34, 36, 38, 40, 43, or 63.

Although a pearl pigment is not particularly limited, for example, there may be mentioned a pigment, such as titanium dioxide-coated mica, argentine, or bismuth oxychloride, having a pearly gloss or an interference gloss.

Although a metallic pigment is not particularly limited, for example, there may be mentioned particles formed from a single component, such as aluminum, silver, gold, platinum, nickel, chromium, tin, zinc, indium, titanium, or copper, or an alloy thereof.

The content of the pigment is, with respect to 100 percent by mass of the ink composition, preferably 0.4 to 12 percent by mass, more preferably 1 to 8 percent by mass, and further preferably 2 to 5 percent by mass.

Resin Particles

The ink composition of this embodiment contains resin particles. Since the resin is selected as described below, the resin particles in the ink composition can be stably dissolved in the nitrogen-containing solvent, and the aggregation of the resin and the adhesion thereof to an inside wall of the head, each of which is caused by the drying of the ink composition, can be suppressed.

Although the type of resin is not particularly limited, for example, a homopolymer or a copolymer formed from (meth)acrylic acid, a (meth)acrylate, acrylonitrile, cyano acrylate, acrylamide, an olefin, styrene, vinyl acetate, vinyl chloride, vinyl alcohol, a vinyl ether, vinyl pyrrolidone, vinyl pyridine, vinyl carbazole, vinyl imidazole, or vinylidene chloride; a fluorine resin, or a natural resin may be mentioned. Among those resins, at least one of a (meth) acrylic resin and a styrene-(meth)acrylic acid copolymer resin is preferable, at least one of an acrylic resin and a styrene-acrylic acid copolymer resin is more preferable, and a styrene-acrylic acid copolymer resin is further preferable. In addition, the above copolymer may be any one of a random copolymer, a block copolymer, an alternate copolymer, and a graft copolymer.

Although not particularly limited, for example, the above resin can be obtained by the following preparation methods, and if needed, at least two thereof may be used in combination. As the preparation methods, for example, there may be mentioned a method in which polymerization (emulsion polymerization) is performed by mixing a polymerization catalyst (polymerization initiator) and a dispersant with a monomer which is a component forming a desired resin; a method in which after a solution obtained by dissolving a resin having a hydrophilic portion in an water-soluble organic solvent is mixed with water, the water-soluble organic solvent is removed by distillation or the like; and a method in which a solution obtained by dissolving a resin in a water-insoluble organic solvent is mixed with a dispersant in an aqueous solution.

The content of the resin is preferably 1 to 15 percent by mass, more preferably 2 to 10 percent by mass, and further preferably 3 to 7 percent by mass. When the content of the resin is set in the range described above, while the abrasion resistance is improved, the resin can be stably dissolved, and the ejection stability can be improved. WATER The ink composition of this embodiment contains water. As the water, for example, pure water, such as ion-exchanged water, ultrafiltrated water, reverse osmosis water, or distilled water, or water, such as ultrapure water, in which ionic impurities are removed as much as possible may be mentioned. In addition, when water sterilized, for example, by UV irradiation or by addition of hydrogen peroxide is used, in the case of long-term storage of a pigment dispersion liquid and an ink using the same, the generation of fungi and bacteria can be suppressed.

Although the content of the water is not particularly limited, in this embodiment of the invention, the ink composition preferably contains water in an amount larger than that of a solvent (organic solvent) which will be described below. In addition, since the ink composition is a so-called "aqueous ink", as a solvent component contained in the ink, water is used at least as an important component. The content of the water is, with respect to 100 percent by mass of the aqueous ink composition, preferably 40 to 95 percent by mass, more preferably 45 to 90 percent by mass, and further preferably 50 to 80 percent by mass.

Nitrogen-Containing Solvent

The ink composition of this embodiment may also contain a nitrogen-containing solvent. Accordingly, the resin can be stably dissolved, the clogging in the vicinity of the nozzles of the head in ink jet recording is prevented, and the ejection stability of the ink composition tends to be more improved. In addition, the nitrogen-containing solvent has a function to promote softening of the resin particles and tends to improve the adhesion even when the heating temperature is low.

Although the nitrogen-containing solvents are not particularly limited, for example, there may be mentioned a pyrrolidone-based, an imidazolidinone-based, an amide ether-based, a pyridine-based, a pyradine-based, and a pyridone-based solvent. In addition, the pyrrolidone-based solvent is preferable, and for example, 2-pyrrolidone, N-methyl-2-pyrrolidone, and N-ethyl-2-pyrrolidone may be mentioned. The nitrogen-containing solvents may be used alone, or at least two thereof may be used in combination.

The content of the nitrogen-containing solvent is, with respect to the total mass of the ink composition, preferably 3 to 30 percent by mass, more preferably 5 to 20 percent by mass, and further preferably 6 to 15 percent by mass. Since the content of the nitrogen-containing solvent is set in the range described above, the resin in the ink composition can be stably dissolved in the nitrogen-containing solvent, and the clogging of the head caused by drying of the ink composition can be suppressed.

The normal boiling point of the nitrogen-containing solvent is preferably 180° C. to less than 280° C. and more preferably 180° C. to less than 250° C. Accordingly, the evaporation of the nitrogen-containing solvent contained in the ink composition in the head is prevented, and the clogging of the nozzles can be prevented. In addition, when the ink composition adheres to the recording medium, the nitrogen-containing solvent can be rapidly evaporated, and in the ink non-absorptive recording medium or the ink low-absorptive recording medium, a sufficient image quality can be obtained.

Other Organic Solvents

The ink according to this embodiment may further contain other organic solvents other than the nitrogen-containing solvent. Although the other organic solvents other than those mentioned above are not particularly limited, for example, there may be concretely mentioned an alcohol and a glycol, such as ethylene glycol, diethylene glycol, triethylene glycol, propylene glycol, dipropylene glycol, 1,3-propanediol, 1,2-butandiol, 1,2-pentanediol, 1,2-hexanediol, 1,4-butanediol, 1,5-pentanediool, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol. Those solvents may be used alone, or at least two types thereof may be used in combination.

The range of the normal boiling point of each of the other organic solvents is the same as that of the nitrogen-containing solvent, is preferably 180° C. to less than 280° C., and more preferably 180° C. to less than 250° C. Accordingly, the evaporation of the organic solvent contained in the ink composition in the head is prevented, and the clogging of the nozzles can be prevented. In addition, when the ink composition adheres to the recording medium, the organic solvent can be rapidly evaporated, and in the ink non-absorptive recording medium or the ink low-absorptive recording medium, a sufficient image quality can be obtained.

The total mass of the organic solvents (the nitrogen-containing solvent may also be included) is, with respect to the total mass of the ink, preferably 5.0 to 30 percent by mass, more preferably 10 to 25 percent by mass, and further preferably 15 to 20 percent by mass. In addition, among the organic solvents, the content of the organic solvent having a normal boiling point of 180° C. to less than 280° C. is preferably in the range described above.

Organic Solvent Having Normal Boiling Point of More than 280° C.

In the ink composition of this embodiment, the content of an organic solvent having a normal boiling point of more than 280° C. is preferably 3 percent by mass or less. When the ink composition contains the organic solvent having a normal boiling point of more than 280° C., the drying property of the ink on the recording medium is seriously degraded. As a result, in various recording media, and in particular, in the ink non-absorptive recording medium or the ink low-absorptive recording medium, the density irregularity of the image is not only apparently observed but also the fixability of the ink cannot be obtained.

The content of the organic solvent having a normal boiling point of more than 280° C. in the ink composition is, with respect to the total mass of the ink composition, preferably 2 percent by mass or less, more preferably 1 percent by mass or less, even more preferably 0.5 percent by mass or less, particularly preferably 0 to less than 0.1 percent by mass, further preferably 0 to less than 0.05 percent by mass, even further preferably 0 to less than 0.01 percent by mass, and most preferably 0 to less than 0.001 percent by mass. When the content is in the range described above, the abrasion resistance of a recorded material formed by using the ink composition is suppressed from being degraded by the organic solvent having a normal boiling point of more than 280° C., and a recorded material more excellent in abrasion resistance can be obtained.

Surfactant

The ink composition of this embodiment preferably contains a surfactant. Although the surfactant is not particularly limited, for example, an acetylene glycol-based surfactant, a fluorine-containing surfactant, and a silicone-based surfactant may be mentioned. Among those surfactants, the acetylene glycol-based surfactant and the silicone-based surfactant are preferable.

Although the acetylene glycol-based surfactant is not particularly limited, for example, at least one type selected from 2,4,7,9-tetramethyl-5-decyne-4,7-diol, an alkylene oxide adduct thereof, 2,4-dimethyl-5-decyne-4-ol, and an alkylene oxide adduct thereof is preferable. Although a commercially available product of the acetylene glycol-based surfactant is not particularly limited, for example, there may be mentioned Olefin 104 series or E series, such as Olefin E1010 (trade name, manufactured by Air Products Japan, Inc.); or Surfynol 465, Surfynol 61, or Surfynol DF110D (trade name, manufactured by Nissin Chemical Industry Co., Ltd.). The acetylene glycol-based surfactants may be used alone, or at least two types thereof may be used in combination.

Although the fluorine-containing surfactant is not particularly limited, for example, there may be mentioned a perfluoroalkyl sulfonic acid salt, a perfluoroalkyl carboxylic acid ester, a perfluoroalkyl phosphoric acid ester, a perfluoroalkyl ethylene oxide adduct, a perfluoroalkyl betaine, or a perfluoroalkyl amine oxide compound. Although a commercially available product of the fluorine-containing surfactant is not particularly limited, for example, there may be mentioned S-144 or S-145 (manufactured by Asahi Glass Co., Ltd.); FC-170C, FC-430, or Fluorad FC4430 (manufactured by Sumitomo 3M Limited); FSO, FSO-100, FSN, FSN-100, or FS-300 (manufactured by DuPont); or FT-250 or 251 (manufactured by Neos Co., Ltd.). The fluorine-containing surfactants may be used alone, or at least two types thereof may be used in combination.

As the silicone-based surfactant, for example, a polysiloxane-based compound or a polyether modified organosiloxane may be mentioned. Although a commercially available product of the silicone-based surfactant is not particularly limited, for example, there may be concretely mentioned BYK-306, BYK-307, BYK-333, BYK-341, BYK-345, BYK-346, BYK-347, BYK-348, or BYK-349 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

The content of the surfactant is, with respect to 100 percent by mass of the ink composition, preferably 0.1 to 2.0 percent by mass, more preferably 0.1 to 1.7 percent by mass, and further preferably 0.1 to 1.5 percent by mass. Since the content of the surfactant is 2.0 percent by mass or less, the abrasion resistance tends to be further improved. In addition, since the content of the surfactant is 0.1 percent by mass or more, the covering property of an obtained recorded material is further improved, and in addition, the ejection stability tends to be further improved.

Other Components

In order to preferably maintain the storage stability of the ink used in this embodiment and the ejection stability thereof from the head, to improve the clogging resistance, and/or to prevent the degradation of the ink, various additives, such as a dissolution auxiliary agent, a viscosity adjuster, a pH adjuster, an antioxidant, an antiseptic agent, a fungicide, a corrosion inhibitor, and a chelating agent trapping metal ions which adversely influence the dispersibility, may be appropriately added to the ink of this embodiment.

Ink Jet Apparatus

The FIGURE shows a schematic cross-sectional view of one example of an ink jet apparatus used for the ink jet recording method according to this embodiment. As shown in the FIGURE, an ink jet apparatus 100 includes an ink jet head 2, an IR heater 3, a platen heater, a hardening heater 5, a cooling fan 6, a pre-heater 7, and a ventilation fan 8. The ink jet head 2 is mounted on a carriage not shown in the FIGURE, and while being moved with respect to a recording medium, the ink jet head 2 is scanned (main-scanned) a plurality of times to apply an ink ejected therefrom to the recording medium for recording. In addition, the ink jet apparatus may be a line printer in which ink adhesion to a recording medium is performed by one scanning.

When the ink composition is ejected from the ink jet head 2, in order to heat a recording medium 1, the ink jet apparatus 100 shown in the FIGURE includes the IR heater 3 and a platen 4 (recording medium support portion) having the platen heater (not shown). In an ink composition application step, when the recording medium is heated, at least one of the IR heater 3 and the platen heater may be used.

In addition, by the use of the IR heater 3, the recording medium can be heated from an ink jet head 2 side. Accordingly, although the ink jet head 2 is likely to be simultaneously heated, compared to the case in which the recording medium is heated from a rear side thereof by the platen heater or the like, the temperature can be increased without being influenced by the thickness of the recording medium. In addition, when the platen heater is used, the recording medium can be heated from a side opposite to the ink jet head 2 side. Accordingly, the ink jet head 2 is relatively unlikely to be heated.

The hardening heater 5 is a heater which dries and solidifies the ink composition recorded on the recording medium. Since the hardening heater 5 heats the recording medium on which an image is recorded, moisture and the like contained in the ink composition are more rapidly evaporated and scattered, and a film can be formed from polymer particles contained in the ink composition. As described above, an ink dried material is strongly fixed (adhered) onto the recording medium, so that a high quality image having an excellent abrasion resistance can be obtained within a short time. A drying temperature by the hardening heater 5 is preferably 40° C. to 120° C., more preferably 60° C. to 100° C., and further preferably 70° C. to 90° C.

The ink jet apparatus 100 may also include the cooling fan 6. After being dried, the ink composition on the recording medium is cooled by the cooling fan 6, so that a film having a good adhesion to the recording medium tends to be formed.

In addition, the ink jet apparatus 100 may also include the pre-heater 7 which heats (pre-heats) the recording medium in advance before the ink composition is ejected onto the recording medium. Furthermore, the ink jet apparatus 100 may also include the ventilation fan 8 so that the ink composition adhered to the recording medium is more efficiently dried. When the pre-heating is performed, since the degree of heating of the recording medium which is simultaneously performed in the reaction liquid application step can be reduced, influence of heat on the head can be preferably reduced.

Method for Controlling Recording Apparatus

This embodiment may also be regarded as a method for controlling a recording apparatus (ink jet apparatus). The control method indicates that, for example, when a recording method which will be described later is performed using the above recording apparatus, by a control portion of the recording apparatus, the recording apparatus is controlled for recording so as to perform the recording method described later.

Recording Medium

In this embodiment, as the recording medium, a non-absorptive recording medium or a low-absorptive recording medium may be used. In the non-absorptive recording medium or the low-absorptive recording medium, as the degree of low absorption or the degree of non-absorption increases, the covering property is liable to be degraded by repletion of an aqueous ink composition. Hence, for the recording medium as described above, the ink jet recording method according to this embodiment is advantageously used.

Incidentally, the "low-absorptive recording medium" or the "non-absorptive recording medium" indicates a recording medium defined by Bristow's method such that a water absorption amount 30 milliseconds from the start of contact is 10 mL/m$^2$ or less. This Bristow's method is the most popular method for measuring a liquid absorption amount in a short time and is also employed by the Technical Association of the Pulp and Paper Industry, Inc. (Japan TAPPI). The detail of the test method is described in "Standard No. 51 "Paper and Paperboard-Liquid Absorption Test Method-Bristow's Method", of "JAPAN TAPPI PAPER AND PULP TEST METHODS, 2000".

In addition, the non-absorptive recording medium or the low-absorptive recording medium may also be classified by the wettability of a recording surface thereof to water. For example, a water droplet having a volume of 0.5 μL is dripped on a recording surface of a recording medium, and the rate in decrease of contact angle (comparison between a contact angle measured at 0.5 milliseconds after landing and that measured at 5 seconds after landing) is measured, so that the recording medium can be characterized. More particularly, as the property of the recording medium, the non-absorption property of the "non-absorptive recording medium" indicates that the above rate in decrease is less than 1%, and the low absorption property of the "low-absorptive recording medium" indicates that the above rate in decrease is 1% to less than 5%. In addition, the absorptive property indicates that the above rate in decrease is 5% or more. In addition, the contact angle may be measured, for example, by using a portable contact angle meter PCA-1 (manufactured by Kyowa Interface Science Co., Ltd.).

Although the low-absorptive recording medium is not particularly limited, for example, a coated paper having a coating layer which receives an oily ink as a surface layer may be mentioned. Although the coated paper is not particularly limited, for example, book printing paper, such as art paper, coat paper, or matte paper, may be mentioned.

Although the non-absorptive recording medium is not particularly limited, for example, a plastic film having no ink absorbing layer or a film formed of a base material, such as paper, and a plastic coated thereon or a plastic film adhered thereto may be mentioned. As the plastic mentioned above, for example, there may be mentioned a poly(vinyl chloride), a poly(ethylene terephthalate), a polycarbonate, a polystyrene, a polyurethane, a polyethylene, or a polypropylene.

Besides the recording media described above, an ink non-absorptive recording medium or an ink low-absorptive recording medium, such as a metal plate formed of iron, silver, copper, aluminum, or the like, or glass, may also be used.

Ink Jet Recording Method

As described above, the ink jet recording method of this embodiment comprises: a reaction liquid application step of ejecting from an ink jet head, a reaction liquid in the form of liquid droplets containing an aggregating agent which aggregates an ink composition so as to adhere the reaction liquid to a recording medium which is a non-absorptive recording medium or a low-absorptive recording medium; a reaction liquid drying step of drying the reaction liquid adhered to the recording medium; and an ink composition application step of ejecting the ink composition in the form of liquid droplets from the ink jet head so as to apply the ink composition to the recording medium to which the reaction liquid is adhered, and in the reaction liquid drying step, before the ink composition is applied, the reaction liquid is dried so that evaporated amounts of water and an organic solvent contained in the reaction liquid are 70 percent by mass or more and 60 percent by mass or less, respectively.

Reaction Liquid Application Step

As described above, the reaction liquid application step is a step of applying the reaction liquid containing at least one of a polyvalent metal compound, an organic acid, and a cationic resin to the recording medium. The polyvalent metal compound, the organic acid, and the cationic resin contained in the reaction liquid each react, for example, with a pigment contained in the ink composition and/or a pigment dispersion resin contained therein and has a function to aggregate the ink composition. Accordingly, the generation of bleeding and the like of an image recorded using the ink composition can be suppressed, and an image having an excellent image quality can be obtained.

The upper limit of the surface temperature of the recording medium in the reaction liquid application step is preferably 45° C. or less, more preferably 40° C. or less, and further preferably 38° C. or less. Although the lower limit of the surface temperature of the recording medium in the application step is not particularly limited, the lower limit is preferably 20° C. or more, more preferably 23° C. or more, even more preferably 25° C. or more, particularly preferably 30° C. or more, and significantly preferably 32° C. or more. Accordingly, since the amount of radiation heat from the platen is small or zero, the drying of the ink composition in the ink jet head and the change in composition thereof can be suppressed, and hence, the clogging of the head can be prevented.

The recording medium is preferably heated by a preheating unit (pre-heater 7) provided at an upstream side in a recording medium transportation direction of the recording medium support portion which supports the recording medium when the reaction liquid is applied thereto, and the reaction liquid is applied to the recording medium thus heated. Since the recording medium is heated by the preheating unit, the evaporated amounts of the water and the organic solvent of the reaction liquid on the recording medium can be adjusted.

The adhesion amount of the reaction liquid in the reaction liquid adhesion region is preferably 3 mg/inch$^2$ or less, more preferably 2.5 mg/inch$^2$ or less, even more preferably 2.0 mg/inch$^2$ or less, and particularly preferably 1.9 mg/inch$^2$ or less. Since the adhesion amount of the reaction liquid is decreased as described above, the drying property of the reaction liquid after the ink composition is applied thereto can be improved, and the image quality can be improved.

In a region in which the adhesion amount of the ink composition is 5 mg/inch$^2$ or more of the ink composition adhesion region, the adhesion amount of the reaction liquid is preferably 0.1 mg/inch$^2$ or more, more preferably 0.2 mg/inch$^2$ or more, even more preferably 0.5 mg/inch$^2$ or more, particularly preferably 1 mg/inch$^2$ or more, and significantly preferably 1.5 mg/inch$^2$ or more. Since the reaction liquid is adhered to the region to which the ink composition is to be applied as described above, the image quality of an image formed on the recording medium can be improved.

The upper limit of the mass of the reaction liquid per one liquid droplet is preferably 10 ng/dot or less, more preferably 8 ng/dot or less, and further preferably 7 ng/dot or less. The lower limit of the mass of the reaction liquid per one liquid droplet is preferably 1 ng/dot or more and more preferably 3 ng/dot or more. Accordingly, since the mass of the reaction liquid per one liquid droplet is set in the range as described above, the bleeding can be suppressed, and the covering property is improved, so that the image quality can be improved.

The resolution of the liquid droplets of the reaction liquid is 200×200 dpi or more, more preferably 360×360 dpi or more, further preferably 720×360 dpi or more, and particularly preferably 720×720 dpi or more. Since the resolution of the liquid droplets of the reaction liquid is increased as described above, the covering property is improved, and the image quality can be improved.

Reaction Liquid Drying Step

In the reaction liquid drying step, before the ink composition is applied, the reaction liquid is dried so that the evaporated amounts of the water and the organic solvent contained in the reaction liquid are 70 percent by mass or more and 60 percent by mass or less, respectively. When the ink composition is applied after the reaction liquid drying step is performed, the evaporated amount of the water contained in the reaction liquid is preferably 80 percent by mass or more, more preferably 90 percent by mass or more, and further preferably 95 percent by mass or more. Although the upper limit is 100 percent by mass or less and is not particularly limited, the upper limit is preferably 99 percent by mass or less. In addition, before the ink composition is applied after the reaction liquid drying step is performed, the evaporated amount of the organic solvent is preferably 50 percent by mass or less, more preferably 30 percent by mass or less, further preferably 20 percent by mass or less, particularly preferably 10 percent by mass or less, and significantly preferably 5 percent by mass or less. Although the lower limit is 0 percent by mass or more and is not particularly limited, the lower limit is preferably 0.5 percent by mass or more. As described above, the remaining amount of water is decreased so as to suppress an excessive reaction of the ink which tends to degrade the covering property of the ink composition on the recording medium, and in order to avoid the degradation in color stability caused by an extremely small amount of water, the remaining amount of the organic solvent which is desired for mixing with the ink composition is increased; hence, the balance of the spreadability of the ink is improved, the covering property is improved, and the bleeding can be suppressed.

In particular, if the drying of the reaction liquid has not progressed very much when the ink composition is applied, since the evaporated amount of the water contained in the reaction liquid is low, and a large amount of water remains, ink droplets brought into contact with the reaction liquid on the recording medium immediately react therewith and do not spread, and the spreadability of the ink on the recording medium is inferior, so that an image quality having an inferior covering property may be obtained. In addition, when a large amount of water remains, since the amount of movable liquids remaining on the recording medium is large, ink liquid droplets adjacent to each other are brought into contact with each other and are mixed together, so that the bleeding may be generated.

On the other hand, in the state in which the drying of the reaction liquid is fairly advanced, water hardly remains, and even if the organic solvent scarcely remains, the aggregating agent is not able to immediately react with ink droplets which are brought into contact with the reaction liquid, so that the reaction of the ink may tend to be delayed. On the other hand, when the drying of the reaction liquid has progressed excessively, the ink composition applied to the recording medium is not able to immediately react with the aggregating agent, and the reaction is delayed, so that a preferable image quality may not be obtained.

According to the results described above, regardless of whether the drying of the reaction liquid is not very advanced or is fairly advanced, since the state of the ink covering the surface of the recording medium is not stabilized, the color of a recorded material is slightly changed by each recording operation, and hence, the color stability may be degraded.

As for the contents of the water and the organic solvent contained in the reaction liquid applied to the recording medium, when the ink composition is applied, the content of the water is, with respect to the total mass of the reaction liquid adhered to the recording medium, preferably 25 percent by mass or less, more preferably 20 percent by mass or less, further preferably 15 percent by mass or less, and particularly preferably 10 percent by mass or more, and although the lower limit is 0 percent by mass or more and is not particularly limited, the lower limit may be 0.5 percent by mass or more, 1 percent by mass or more, or 2 percent by mass or more. In addition, when the ink composition is applied, the content of the organic solvent is, with respect to the total mass of the reaction liquid adhered to the recording medium, preferably 5 percent by mass or more, more preferably 10 percent by mass or more, and further preferably 15 percent by mass or more, and although the upper limit is not particularly limited, the upper limit is preferably 40 percent by mass or less, more preferably 30 percent by mass or less, and further preferably 25 percent by mass or less.

The temperature and the time in the reaction liquid drying step are controlled so that when the ink composition is applied after the reaction liquid drying step is performed, the evaporated amounts of the water and the organic solvent contained in the reaction liquid are in the ranges described above.

Ink Composition Application Step

The ink composition application step is a step of ejecting from an ink jet head, the ink composition in the form of liquid droplets so as to apply the ink composition to the recording medium to which the reaction liquid is adhered. The ink jet head ejecting the ink composition can be the same ink jet head ejecting the reaction liquid. In this case, the ink jet head ejecting the reaction liquid can also be used for the ink composition application step. On the other hand, the ink jet head ejecting the ink composition can be a different ink jet head than the ink jet head ejecting the reaction liquid. In this case, another ink jet head can be used for the ink composition application step.

Ink-Composition Primary Drying Step

The ink jet recording method of this embodiment may further comprise an ink-composition primary drying step of drying the ink composition applied to the recording medium at the recording medium support portion which faces the ink jet head ejecting the ink composition. In addition, in this ink-composition primary drying step, the ink composition is preferably dried so that the evaporated amount of the total water contained in the reaction liquid and the ink composition is 70 percent by mass or more and is further preferably dried so that the evaporated amount of the organic solvent is 60 percent by mass or less. Accordingly, the balance between the improvement in image quality and the decrease in recording time can be obtained.

A time from the completion of the application of the reaction liquid to the recording medium to the start of the application of the ink composition may be adjusted so that the drying of the reaction liquid is appropriately performed, and although not particularly limited, for example, the time described above is preferably one minute or less and more preferably 30 seconds or less.

The minimum amount of the ink composition applied in the ink composition application step is preferably 5 mg/inch$^2$ or more, more preferably 6 mg/inch$^2$ or more, and further preferably 7 mg/inch$^2$ or more. In addition, the maximum amount of the ink composition applied in the ink composition application step is preferably 15 mg/inch$^2$ or less, more preferably 14 mg/inch$^2$ or less, and further preferably 13 mg/inch$^2$ or less. The amount of the ink composition set in the range described above is preferable since a practical recorded material can be easily obtained, and an excellent image quality can be obtained.

Ink-Composition Secondary Drying Step

The ink jet recording method of this embodiment may further comprise, after the above ink-composition primary drying step is performed, an ink-composition secondary drying step of heating the recording medium to which the ink composition is adhered. By this step, the resin contained in the ink composition on the recording medium is melted, and as a result, a recorded material having an excellent covering property can be formed. In this step, the temperature of the recording medium in the drying step is preferably 50° C. to 150° C., more preferably 70° C. to 120° C., and further preferably 80° C. to 100° C. Since the drying temperature is set in the range described above, the abrasion resistance tends to be further improved.

By the ink jet recording method according to this embodiment, when the ink composition is applied, the evaporated amount of the water contained in the reaction liquid is high (70 percent by mass or more), and the evaporated amount of the organic solvent is low (60 percent by mass or less). As described above, since the remaining amount of water which disturbs the aggregation of the ink composition is decreased, and the remaining amount of the organic solvent which is desired for mixing with the ink composition is increased, the balance of the spreadability of the ink is improved, the covering property is improved, and the bleeding can be suppressed.

Example 1

Hereinafter, embodiments of the invention will be described in more detail with reference to examples and comparative examples. However, the invention is not limited to the following examples.

Preparation of Reaction Liquid

Materials were mixed together to obtain the compositions (percent by mass) shown in the following Table and were then sufficiently stirred, so that various reaction liquids were obtained. In addition, the content of the aggregating agent of a reaction liquid 1 was approximately 4.7 percent by mass as a solid component of calcium acetate, and as was the case described above, the content of the aggregating agent in a reaction liquid 6 was approximately 3.5 percent by mass as a solid component of succinic acid.

TABLE 1

| | | Normal Boiling Point of Organic Solvent (° C.) | Reaction Liquid 1 | Reaction Liquid 2 | Reaction Liquid 3 | Reaction Liquid 4 | Reaction Liquid 5 | Reaction Liquid 6 | Reaction Liquid 7 |
|---|---|---|---|---|---|---|---|---|---|
| Aggregating Agent | Calcium Acetate monohydrate (mol/kg) | | 0.3 | 0.3 | 0.9 | 0.3 | | | 0.3 |
| | Polyallylamine (percent by mass) | | | | | | 4.7 | | |
| | Succinic Acid (mol/kg) | | | | | | | 0.3 | |
| Organic Solvent | Propylene Glycol (percent by mass, hereinafter the same shall apply) | 188 | 20 | 5 | 20 | 15 | 20 | 20 | |
| | 2-Pyrrolidone | 245 | 5 | 5 | 5 | 5 | 5 | 5 | 5 |
| | Glycerin | 290 | | | | 5 | | | |
| | Ethylene Glycol Monomethyl Ether | 124 | | 15 | | | | | 20 |
| | Surfactant BYK348 (Manufactured by BYK Japan KK) | | 1 | 1 | 1 | 1 | 1 | 1 | 1 |
| | Water | | Balance | Balance | Balance | Balance | Balance | Balance | Balance |
| | Total | | 100 | 100 | 100 | 100 | 100 | 100 | 100 |

Preparation of Ink Composition

In addition, in this example, the composition shown in Table 2 was used as the ink composition. The contents of components were each represented by part(s) by mass.

TABLE 2

| | Ink 1 | Ink 2 |
|---|---|---|
| Cyan Pigment P.B.15:3 (Solid Component) | 3 | 3 |
| Resin Joncryl 7610 (Styrene-Acrylic Resin, Manufactured by BASF Japan) (Solid Component) | 3 | 3 |
| Propylene Glycol | 8 | 3 |
| 2-Pyrrolidone | 7 | 7 |
| Glycerin | | 5 |
| Surfactant BYK348 (Manufactured by BYK Japan KK) | 1 | 1 |
| Water | Balance | Balance |
| Total | 100 | 100 |

As shown in Table 3, various conditions (the reaction liquid, the applied amount thereof, the temperature of the recording medium, the moisture evaporated amount of the reaction liquid after the drying thereof, the evaporated amount of the organic solvent in the reaction liquid after the drying thereof, the dot size of the reaction liquid, the recording resolution of the reaction liquid, the recording medium, the ink jet apparatus, and the ink) of the ink jet recording method were changed and recorded, and the color stability, the image formation (bleeding), the image formation (covering property), the abrasion resistance, and the degree of clogging by the reaction liquid were evaluated. Hereinafter, the conditions of the recording method and the evaluation tests will be described in detail.

TABLE 3

| | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| Reaction Liquid No. | Reaction Liquid 1 | Reaction Liquid 1 | Reaction Liquid 2 | Reaction Liquid 3 | Reaction Liquid 4 | Reaction Liquid 5 | Reaction Liquid 6 | Reaction Liquid 2 | Reaction Liquid 1 | Reaction Liquid 1 | Reaction Liquid 1 | Reaction Liquid 1 | Reaction Liquid 1 |
| Adhesion Amount of Reaction Liquid (mg/inch2) | 1 | 1 | 1 | 1 | 1 | 1 | 1 | 1 | 1 | 1 | 1 | 1 | 1 |
| Temperature of Recording Medium (° C.) | 35 | 35 | 35 | 35 | 45 | 35 | 35 | 35 | 50 | 35 | 35 | 40 | 38 |
| Moisture Evaporated amount of Reaction Liquid after Drying thereof (%) | 90 | 80 | 95 | 90 | 90 | 90 | 90 | 90 | 100 | 90 | 90 | 90 | 90 |
| Evaporated amount of Organic Solvent in Reaction Liquid after Drying thereof (%) | 5 | 5 | 50 | 5 | 5 | 5 | 5 | 5 | 50 | 5 | 5 | 5 | 5 |
| Dot Size of Reaction Liquid (ng/dot) | 5 | 5 | 5 | 5 | 5 | 5 | 5 | 5 | 5 | 9 | 5 | 5 | 5 |
| Recording Resolution of Reaction Liquid (dpi) | 720 × 720 | 720 × 720 | 720 × 720 | 720 × 720 | 720 × 720 | 720 × 720 | 720 × 720 | 720 × 720 | 720 × 720 | 720 × 720 | 720 × 360 | 720 × 720 | 720 × 720 |
| Recording Medium No. | Recording Medium 1 | Recording Medium 1 | Recording Medium 1 | Recording Medium 1 | Recording Medium 1 | Recording Medium 1 | Recording Medium 1 | Recording Medium 1 | Recording Medium 1 | Recording Medium 1 | Recording Medium 1 | Recording Medium 1 | Recording Medium 1 |
| Apparatus No. | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 | Apparatus 1 |
| Ink No. | Ink 1 | Ink 1 | Ink 1 | Ink 1 | Ink 1 | Ink 1 | Ink 1 | Ink 1 | Ink 1 | Ink 1 | Ink 1 | Ink 1 | Ink 1 |
| Color Stability (ΔE) | A | B | B | A | B | A | A | A | B | A | A | B | A |
| Image Formation (Bleeding) | A | B | B | A | B | B | B | B | A | B | B | A | A |
| Image Formation (Covering Property) | A | A | B | A | A | A | A | A | B | B | B | A | A |
| Abrasion Resistance | A | A | A | B | C | A | B | B | A | A | A | A | A |
| Clogging by Reaction Liquid | A | A | B | A | A | A | A | A | C | A | A | B | A |

TABLE 3-continued

| | Example 14 | Example 15 | Example 16 | Comparative Example 1 | Comparative Example 2 | Comparative Example 3 | Comparative Example 4 |
|---|---|---|---|---|---|---|---|
| Reaction Liquid No. | Reaction Liquid 1 | Reaction Liquid 1 | Reaction Liquid 1 | Reaction Liquid 1 | Reaction Liquid 1 | Reaction Liquid 1 | Reaction Liquid 7 |
| Adhesion Amount of Reaction Liquid (mg/inch2) | 1 | 1 | 1 | 1 | 1 | 1 | 1 |
| Temperature of Recording Medium (° C.) | 35 | 45 | 35 | 25 | 60 | 25 | 35 |
| Moisture Evaporated amount of Reaction Liquid after Drying thereof (%) | 90 | 90 | 80 | 50 | 100 | 50 | 50 |
| Evaporated amount of Organic Solvent in Reaction Liquid after Drying thereof (%) | 5 | 5 | 5 | 0 | 80 | 0 | 40 |
| Dot Size of Reaction Liquid (ng/dot) | 5 | 5 | 5 | 5 | 5 | 5 | 5 |
| Recording Resolution of Reaction Liquid (dpi) | 720 × 720 | 720 × 720 | 720 × 720 | 720 × 720 | 720 × 720 | 720 × 720 | |
| Recording Medium No. | Recording Medium 2 | Recording Medium 1 | Recording Medium 1 | Recording Medium 1 | Recording Medium 1 | Recording Medium 3 | Recording Medium 1 |
| Ink No. | Ink 1 | Ink 2 | Ink 1 | Ink 1 | Ink 1 | Ink 1 | Ink 1 |
| Apparatus No. | Apparatus 1 | Apparatus 1 | Apparatus 1 | Apparatus 1 | Apparatus 1 | Apparatus 1 | Apparatus 1 |
| Color Stability (ΔE) | A | B | A | C | C | B | C |
| Image Formation (Bleeding) | A | C | B | C | A | A | C |
| Image Formation (Covering Property) | A | A | A | C | B | A | C |
| Abrasion Resistance | A | C | A | A | A | D | A |
| Clogging by Reaction Liquid | A | B | B | A | D | A | C |

Conditions of Ink Jet Recording Method
Recording Apparatus

As the ink jet apparatus, a modified apparatus SC-S30650 (manufactured by Seiko Epson Corp.) was prepared. A heater of a platen was configured so that the temperature was arbitrarily adjusted. In addition, a pre-heater provided at an upstream side of the platen was also configured so that the temperature was adjusted. A surface temperature of a recording medium to which a reaction liquid was to be applied was set to the value shown in the table. However, in the case of a temperature of 25° C., the heater was set to off. A surface temperature of the recording medium at a position in a transportation direction thereof at which the reaction liquid was started to be applied was measured. The reaction liquid was charged in one nozzle line, and the ink was charged in another nozzle line. The nozzle lines each had a nozzle density of 360 dpi.

Although the basic structure of the recording apparatus was as described above, the apparatus 1 and the apparatus 2 in the table were different from each other as describe below.
Apparatus 1: A recording medium pre-heated by the pre-heater provided at an upstream side was transported to the platen. The platen heater was also used as an auxiliary.
Apparatus 2: The pre-heater was set to off, and only the platen heater was used.

Recording Method

The reaction liquid was ejected from the nozzle line to a recording medium set in the printer and was applied to a test pattern portion. Next, after a predetermined time passed, the recording medium was rewound, and the ink was applied on the test pattern portion. A drying time of each example was determined in advance so that when the ink started to be applied, the evaporated amount of the reaction liquid was represented by the value shown in the table, and the drying time thus determined was set in each example. The amount of the ink per one ink droplet was adjusted so that the adhesion amount described below was obtained at a recording resolution of 720×720 dpi.

The adhesion amount of the reaction liquid and the ejection amount per one droplet thereof were each set to the value shown in the table, the maximum recording resolution at which the reaction liquid could be applied was set to the value shown in the table, and in order to set the adhesion amount to the value shown in the table, the adjustment was performed such that reaction liquid droplets were repeatedly applied to the same liquid droplet position or liquid droplet positions to which the reaction liquid is not adhered are allowed to be present.

After the primary drying was performed, the recording medium on the platen was dried for a predetermined time so that the moisture evaporated amount at the pattern portion was set to 95 percent by mass with respect to the total moisture of the reaction liquid and the ink at an initial adhesion stage thereof. Subsequently, by using an after heater (hardening heater) provided at a downstream side of the platen, the recording medium was post-heated at 70° C. for one minute.

Type of Recording Medium

As recording media 1, 2, and 3, the following recording media were used.
Recording medium 1: PET50A PL Shin, manufactured by Lintec Corp., non-absorptive recording medium
Recording medium 2: vinyl chloride resin, SV-G-1270G, manufactured by Roland DG Corp., non-absorptive recording medium
Recording medium 3: high-quality paper, manufactured by Hokuetsu Kishu Paper Co. Ltd., absorptive recording medium Method for Measuring Evaporated Amount The reaction liquid was applied to the recording medium, and after a predetermined time passed and before the ink was started to be applied, the reaction liquid was sampled. The moisture amount of the sample thus obtained was measured using a moisture meter (Karl Fischer moisture meter (micro-volume moisture meter AQ-2200, manufactured by Hiranuma Sangyo Co., Ltd.), so that the evaporation amount of water was calculated from the moisture amount of the reaction liquid at an initial stage. The evaporated amount (percent by mass) is the rate of a moisture amount lost by the evaporation to the moisture amount contained in the reaction liquid thus adhered. When the measurement was performed by changing the temperature of the recording medium and the predetermined time, the relationship between the heating condition and the evaporated amount could be obtained.

The evaporated amount of the organic solvent was measured by a liquid chromatography using the reaction liquid sampled in a manner similar to that described above such that the content of each organic solvent was measured, and from the content of each organic solvent of the reaction liquid at an initial stage, the evaporated amounts of all the organic solvents were calculated. The analysis by the liquid chromatography was performed using a commercially available apparatus (trade name: XevoG2-SQTof, manufactured by Waters).

Color Stability ($\Delta E$)

First, one pattern having a size of 3×3 cm was continuously recorded on 50 recording media having an A4 size under the conditions of the recording test. The ink adhesion amount of the pattern was set to 8 mg/inch$^2$. The color of each pattern was measured, and the maximum difference ($\Delta E$) in color was calculated. As a color measurement device, CM-700d manufactured by Konica Minolta Inc. was used. The evaluation criteria are as follows.
A: $\Delta E$ is less than 1.0.
B: $\Delta E$ is 1.0 to less than 1.5.
C: $\Delta E$ is 1.5 or more.

Image Formation (Bleeding)

Test patterns were recorded. Patterns were recorded by changing the ink adhesion amount from 5 to 10 mg/inch$^2$ by 1 mg each. A yellow ink having the same composition except that the color material was changed to a yellow pigment (P.Y. 155) was prepared, and in the pattern, the two types of inks were arranged adjacent to each other, so that a pattern using the above ink and the yellow ink was recorded for each example. The boundary portion between the colors in the pattern was observed by visual inspection. The evaluation criteria are as follows.
A: No color bleeding is observed at the boundary portion between the colors in a pattern having an adhesion amount of 9 mg/inch$^2$.
B: Color bleeding is not observed at the boundary portion between the colors in a pattern having an adhesion amount of 6 to 8 mg/inch$^2$ but is observed in a pattern having an ink adhesion amount of 9 mg/inch$^2$.
C: Color bleeding is observed at the boundary portion between the colors in a pattern having an adhesion amount of 6 mg/inch$^2$.

Image Formation (Covering Property)

Patterns were recorded by changing the ink adhesion amount in the pattern portion from 8 to 11 mg/inch$^2$ by 1 mg each. The evaluation was performed by visual inspection whether the base color of the recording medium in the pattern was observed through the ink or not (whether the recording medium was covered with the ink or not).
A: Solid image is covered by an adhesion amount of 8 mg/inch$^2$.
B: Solid image is covered by an adhesion amount of 9 to 10 mg/inch$^2$.
C: Solid image is not covered by an adhesion amount of 10 mg/inch$^2$.
Abrasion Resistance
The ink adhesion amount of the pattern portion was set to 9 mg/inch$^2$. The pattern portion was tested.
A: The pattern portion is not peeled away by rubbing 50 times using a Gukusin-type rubbing tester.
B: The pattern portion is partially peeled away (less than 10% of the area) by rubbing 50 times using a Gukusin-type rubbing tester.
C: The pattern portion is peeled away (10% to less than 20% of the area) by rubbing 50 times using a Gukusin-type rubbing tester.
D: The pattern portion is peeled away (20% or more of the area) by rubbing 50 times using a Gukusin-type rubbing tester.
Clogging
After the head was left on the recording medium for one day without being capped (nozzles were exposed) under the conditions of the recording test, cleaning (CL) was performed, and the recovery of the nozzles was evaluated. The reaction liquid in a volume of 0.5 cc was discharged from the nozzle line by one cleaning (CL).
A: Recovery is obtained by performing CL 3 times or less.
B: Recovery is obtained by performing CL 6 times or less.
C: Recovery is obtained by performing CL 9 times.
D: Recovery is not obtained by performing CL 9 times.

As shown in Table 3, by the recording methods of all the examples, the color stability and the image formation (covering property) on the non-absorptive recording media (recording media 1 and 2) were both evaluated as B or higher. Furthermore, in many but not all examples, the anti-bleeding property, the abrasion resistance, and the degree of clogging were evaluated as B or higher. On the other hand, in two out of the four comparative examples, the anti-bleeding property and the covering property were both inferior. Furthermore, the color stability was inferior in three comparative examples.

In particular, in Comparative Example 1, since a large amount of water remained in the reaction liquid, the color stability, the image formation (bleeding), and the image formation (covering property) were evaluated low.

In Comparative Example 2, since the water in the reaction liquid was not only evaporated but also most of the organic solvent was evaporated, as a result, the color stability was degraded. In addition, since the temperature of the recording medium was required to be considerably increased, the head is heated, so that the degree of clogging by the reaction liquid was degraded.

In Comparative Example 3, since the high-quality paper was used, although the image formation (bleeding) was evaluated high, the abrasion resistance was degraded.

In Comparative Example 4, although the organic solvent remained in the reaction liquid, since a large amount of water remained therein, the color stability, the image formation (bleeding), and the image formation (covering property) were evaluated low.

The entire disclosure of Japanese Patent Application No. 2017-033487 filed Feb. 24, 2017 is expressly incorporated herein by reference.

What is claimed is:

1. An ink jet recording method for recording an image onto a non-absorptive or low-absorptive recording medium, the method comprising:
    a reaction liquid application step of ejecting liquid droplets of a reaction liquid onto the recording medium, the reaction liquid containing an aggregating agent configured to aggregate an ink composition;
    a reaction liquid drying step of drying the reaction liquid adhered to the recording medium; and
    an ink composition application step of ejecting liquid droplets of the ink composition so as to apply the ink composition to the recording medium to which the reaction liquid was applied,
    wherein, in the reaction liquid drying step, the reaction liquid is dried so that an evaporated amount of water and an organic solvent contained in the reaction liquid are 70 percent by mass or more and 60 percent by mass or less, respectively, immediately before the ink composition application step.

2. The ink jet recording method according to claim 1, wherein the recording medium has a surface temperature of 45° C. or less during the reaction liquid application step.

3. The ink jet recording method according to claim 1, wherein, in the reaction liquid drying step, the reaction liquid is dried so that the evaporated amount of the water and the organic solvent contained in the reaction liquid are 90 percent by mass or more and 10 percent by mass or less, respectively, immediately before the ink composition step.

4. The ink jet recording method according to claim 1, wherein the reaction liquid contains an organic solvent having a normal boiling point of 150° C. to 280° C.

5. The ink jet recording method according to claim 1, wherein the reaction liquid contains 3 percent by mass or less of an organic solvent having a normal boiling point greater than 280° C.

6. The ink jet recording method according to claim 1, wherein the ink composition contains 3 percent by mass or less of an organic solvent having a normal boiling point greater than 280° C.

7. The ink jet recording method according to claim 1, further comprising:
    pre-heating the recording medium upstream of a recording medium support in a recording medium transportation direction, the recording medium support supporting the recording medium while the reaction liquid is ejected thereto,
    wherein the reaction liquid is applied to the recording medium while the recording medium is in a heated state.

8. The ink jet recording method according to claim 1, wherein, in the reaction liquid application step, an amount of the reaction liquid applied to a reaction liquid adhesion region is 3 mg/inch$^2$ or less.

9. The ink jet recording method according to claim 1, wherein, in an ink composition adhesion region, an amount of the ink composition is 5 mg/inch$^2$ or more and an amount of the reaction liquid is 0.1 mg/inch$^2$ or more.

10. The ink jet recording method according to claim 1, wherein a content of the aggregating agent in the reaction liquid is 1 to 20 percent by mass.

11. The ink jet recording method according to claim 1, wherein a mass of the reaction liquid per one liquid droplet in the reaction liquid application step is 10 ng/dot or less.

12. The ink jet recording method according to claim 1, wherein a resolution of the liquid droplets of the reaction liquid in the reaction liquid application step is 200×200 dpi or more.

13. The ink jet recording method according to claim 1, wherein the aggregating agent is at least one of a polyvalent metal salt, an organic acid, or a cationic compound.

14. The ink jet recording method according to claim 1, further comprising:
an ink-composition primary drying step of drying the ink composition adhered to the recording medium while the recording medium is supported by a recording medium support which faces an ink jet head ejecting the ink composition,
wherein, in the ink-composition primary drying step, the ink composition is dried until a total content of water contained in the reaction liquid and the ink composition is 70 percent by mass or more.

15. The ink jet recording method according to claim 1, wherein the ejected reaction liquid contains 45 to 90 percent by mass of water and 5 to 45 percent by mass of the organic solvent.

16. An ink jet recording method for recording an image onto a non-absorptive or low-absorptive recording medium, the method comprising:
ejecting droplets of a reaction liquid onto the recording medium, the reaction liquid containing an aggregating agent;
drying the reaction liquid ejected onto the recording medium; and
after the drying is complete, ejecting droplets of an ink composition onto the reaction liquid,
wherein the drying is complete after an evaporated amount of the water and an organic solvent in the reaction liquid are 70 percent by mass or more and 60 percent by mass or less, respectively.

17. The ink jet recording method according to claim 16, wherein the reaction liquid contains an organic solvent having a normal boiling point of 150° C. to 280° C.

18. The ink jet recording method according to claim 17, wherein the reaction liquid contains 3 percent by mass or less of an organic solvent having a normal boiling point greater than 280° C.; and
the ink composition contains 3 percent by mass or less of an organic solvent having a normal boiling point greater than 280° C.

19. The ink jet recording method according to claim 16, wherein a content of the aggregating agent in the reaction liquid is 1 to 20 percent by mass.

20. The ink jet recording method according to claim 16, wherein the ejected reaction liquid contains 45 to 90 percent by mass of water and 5 to 45 percent by mass of the organic solvent.

* * * * *